No. 652,650. Patented June 26, 1900.
J. A. STONE.
METAL TRACTION WHEEL.
(Application filed Mar. 2, 1900.)

(No Model.)

Witnesses:

Inventor:

UNITED STATES PATENT OFFICE.

JOHN A. STONE, OF CHICAGO, ILLINOIS, ASSIGNOR TO THE DEERING HARVESTER COMPANY, OF SAME PLACE.

METAL TRACTION-WHEEL.

SPECIFICATION forming part of Letters Patent No. 652,650, dated June 26, 1900.

Application filed March 2, 1900. Serial No. 7,089. (No model.)

*To all whom it may concern:*

Be it known that I, JOHN A. STONE, a citizen of the United States, residing at Chicago, in the county of Cook and State of Illinois, have invented certain new and useful Improvements in Metal Traction-Wheels; and I do hereby declare the following to be a full, clear, and exact description of the invention, such as will enable others skilled in the art to which it appertains to make and use the same.

The object of my invention is to produce a wheel which is simple in construction and cheap in manufacture and which possesses superior advantages for use as a main or traction wheel.

Figure 2:
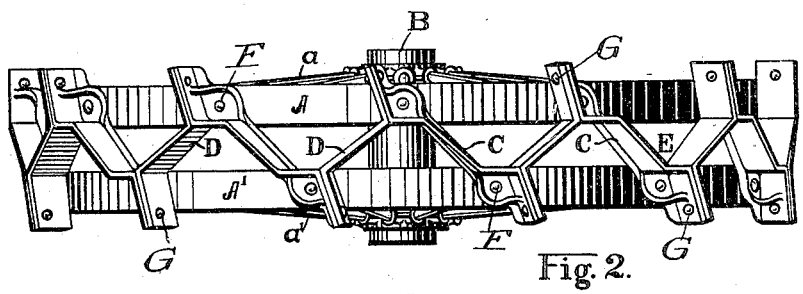
Figure 1:
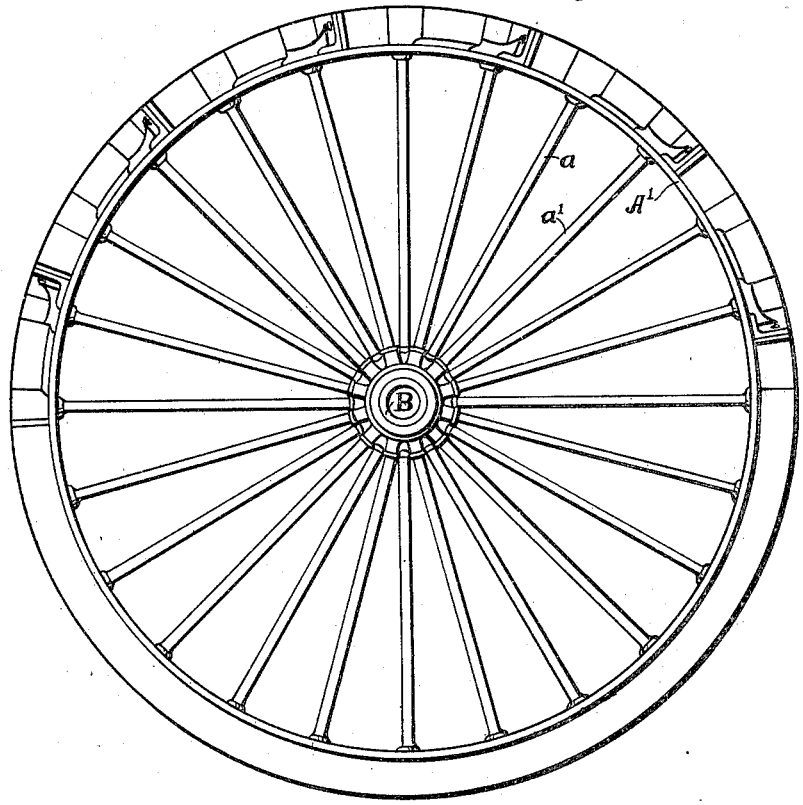

In the drawings, wherein like reference-letters indicate like or corresponding parts, Figure 1 is a side elevation of my improved wheel, and Fig. 2 is a plan view of the same.

In the drawings, A A' are rims, each provided with a series of suitable spokes a and a'. The two rims A and A' are of substantially the same size and, with their spokes, are preferably substantial duplicates of one another.

B is a hub member to which the spokes of both sections are secured in any suitable manner.

C C are bars or straps extending from one rim-section to the other and firmly and effectually connecting the two. In the preferred form the said bars or straps are set edgewise to form lugs upon the periphery of the wheel to engage with the surface of the ground in the usual manner. In wheels adapted to carry considerable weight and which are thus subjected to additional strain I provide additional straps D D, which are also set edgewise and connect the rim-sections and are so constructed and positioned as to coact with the bars C C to firmly secure and brace the two sections in proper position. If desired, they also may act as lugs upon the periphery of the wheel, as shown in the drawings. In the preferred form shown the bars C C are arranged parallel to one another and extend diagonally across the periphery of the wheel, while the bars D D also extend parallel to one another and in an opposite direction diagonally across the periphery of the wheel, the ends of the two bars being firmly secured together. As thus constructed the two series of bars form a continuous zigzag line of lugs around the periphery of the wheel and in the most effectual manner firmly secure the two sections together.

If desired, the two rims A A' may be in close contact with one another; but in the preferred construction shown they are separated by a space E, which permits the soil or earth to freely pass between the two rims at that point when the wheel is in operation. By this means the surface of the wheel does not become clogged, but is constantly kept clear, so that the lugs may effectually grip the surface of the ground when the wheel is in use.

The bars or straps C D may be of any suitable form, that shown in the drawings being preferred. As shown, the bars C C are firmly secured at their ends by bolts or rivets F to the rims A A', while the bars D are constructed to be secured at their ends by bolts or rivets G to the ends of the bars C, both extending beyond the rims to increase the ground contact of the lugs. The wheel is of metal or mainly so, and the usual means may be employed for securing the parts together.

My improved wheel is well adapted for use as the main wheel for harvesters and like machines; but I do not wish to be understood as limiting myself to its use for such purposes, as it is adapted for all the various purposes for which such wheels are employed.

While I have shown my improved wheel as comprising but two sections A A', it is obvious that, if desired, more than two such sections may be so connected to form a single wheel. Hence I do not wish to be understood as limiting myself in this respect.

Having thus described my invention, what I claim as new, and desire to secure by Letters Patent, is—

1. A main or traction wheel, comprising a plurality of wheel-sections, each consisting of a rim and a series of spokes sustaining the same, in combination with a hub member to which the inner ends of the spokes are secured, and bars C set edgewise and extending across the face of the rims and spanning the space between.

2. A main or traction wheel, comprising a plurality of wheel-sections, each consisting of a rim and a series of spokes sustaining the same, in combination with a hub member to which the inner ends of the several spokes are secured, bars C connecting the two rims, and reinforcing-bars D, substantially as described.

3. A main or traction wheel comprising a plurality of duplicate wheel-sections, each consisting of a rim and a series of spokes sustaining the same, in combination with a hub member to which the inner ends of the several spokes are secured, a series of parallel bars extending diagonally across the periphery of the wheel and connecting the rim-sections, and a series of reinforcing-bars extending diagonally across the periphery of the wheel in an opposing direction, substantially as described.

In testimony whereof I affix my signature in presence of two witnesses.

JOHN A. STONE.

Witnesses:
CHAS. N. CHAMBERS,
MARVIN CRAMER.